(12) United States Patent
Jeong et al.

(10) Patent No.: US 7,953,148 B2
(45) Date of Patent: *May 31, 2011

(54) SIGNAL COMPRESSING SYSTEM

(75) Inventors: Je-Chang Jeong, Seoul (KR); Hen-Hee Mun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,070

(22) Filed: Dec. 28, 2010

(65) Prior Publication Data

US 2011/0085596 A1 Apr. 14, 2011

Related U.S. Application Data

(63) Continuation of application No. 12/574,255, filed on Oct. 6, 2009, which is a continuation of application No. 12/348,621, filed on Jan. 5, 2009, now Pat. No. 7,616,687, which is a continuation of application No. 11/873,282, filed on Oct. 16, 2007, now abandoned, which is a continuation of application No. 10/612,013, filed on Jul. 3, 2003, now Pat. No. 7,292,657, which is a continuation of application No. 09/703,649, filed on Nov. 2, 2000, now Pat. No. 6,680,975, which is a continuation of application No. 08/024,305, filed on Mar. 1, 1993, now Pat. No. 6,263,026.

(30) Foreign Application Priority Data

Feb. 28, 1992 (KR) .................................. 92-003398

(51) Int. Cl.
H04B 1/66 (2006.01)

(52) U.S. Cl. ................................................. 375/240.03

(58) Field of Classification Search ............. 375/240.15, 375/240.16, 240.17, 240.03, 240.04, 240.23, 375/240.24, 240.26; 382/236, 232, 234; H04N 7/12; H04B 1/66
See application file for complete search history.

(56) References Cited

U.S. PATENT DOCUMENTS

| | | | |
|---|---|---|---|
| 4,144,547 A | 3/1979 | Stoffel | |
| 4,447,886 A | 5/1984 | Meeker | |
| 4,460,923 A * | 7/1984 | Hirano et al. | 348/413.1 |
| 4,720,743 A * | 1/1988 | Iinuma et al. | 375/240.16 |
| 4,745,473 A | 5/1988 | Hall | |
| 4,751,742 A | 6/1988 | Meeker | |
| 4,754,336 A | 6/1988 | Nishizawa | |
| 4,821,119 A | 4/1989 | Gharavi | |
| 4,912,668 A | 3/1990 | Aubie et al. | |
| 4,920,426 A | 4/1990 | Hatori et al. | |

(Continued)

OTHER PUBLICATIONS

Motion video coding in CCITT SG XV-the video source coding; Plomepn, R.; Hatori, Y.; Geuen, W.; Guichard, J.; Guglielmo, M.; Bruseweitz, H.; Global Telecommunications Conference, 1988, and Exhibition. 'Communications for the Information Age.' pp. 0997-1004.

(Continued)

*Primary Examiner* — Tung Vo

(74) *Attorney, Agent, or Firm* — Sughrue Mion, PLLC

(57) ABSTRACT

A multi-scanner scans a signal according to several different patterns. A scanning pattern selector determines which scanning pattern produced the most efficient coding result, for example, for runlength coding, and outputs a coded signal, coded most efficiently, and a selection signal which identifies the scanning pattern found to be most efficient.

4 Claims, 4 Drawing Sheets

U.S. PATENT DOCUMENTS

| | | | |
|---|---|---|---|
| 4,974,078 A | 11/1990 | Tsai | |
| 4,985,766 A | 1/1991 | Morrison et al. | |
| 4,999,705 A | 3/1991 | Puri | |
| 5,021,891 A | 6/1991 | Lee | |
| 5,045,938 A | 9/1991 | Sugiyama | |
| 5,057,917 A | 10/1991 | Shalkauser et al. | |
| 5,073,820 A | 12/1991 | Nakagawa et al. | |
| 5,097,331 A | 3/1992 | Chen et al. | |
| 5,107,345 A | 4/1992 | Lee | |
| 5,121,205 A | 6/1992 | Ng et al. | |
| 5,136,371 A | 8/1992 | Savatier et al. | |
| 5,185,819 A | 2/1993 | Ng et al. | |
| 5,187,589 A | 2/1993 | Kono et al. | |
| 5,196,933 A | 3/1993 | Henot | |
| 5,216,503 A | 6/1993 | Paik et al. | |
| 5,218,435 A | 6/1993 | Lim et al. | |
| 5,223,926 A | 6/1993 | Stone et al. | |
| 5,227,878 A | 7/1993 | Puri et al. | |
| 5,228,028 A * | 7/1993 | Cucchi et al. | 370/392 |
| 5,253,055 A | 10/1993 | Civanlar et al. | |
| 5,260,781 A | 11/1993 | Soloff et al. | |
| 5,260,782 A | 11/1993 | Hui | |
| 5,276,525 A | 1/1994 | Gharavi | |
| 5,293,434 A | 3/1994 | Feig et al. | |
| 5,299,019 A | 3/1994 | Pack et al. | |
| 5,321,776 A | 6/1994 | Shapiro | |
| 5,367,629 A | 11/1994 | Chu et al. | |
| 5,414,780 A | 5/1995 | Carnahan | |
| 5,583,657 A | 12/1996 | Jeong | |
| 5,757,973 A | 5/1998 | Wilkinson et al. | |
| 5,990,957 A | 11/1999 | Ryoo | |
| 6,263,026 B1 | 7/2001 | Je-Chang et al. | |
| 6,680,975 B1 | 1/2004 | Jeong et al. | |
| 7,292,657 B2 | 11/2007 | Jeong et al. | |
| 7,609,760 B2 | 10/2009 | Jeong et al. | |
| 7,616,687 B2 | 11/2009 | Jeong et al. | |
| 7,684,490 B2 | 3/2010 | Jeong et al. | |
| 7,724,821 B2 | 5/2010 | Jeong et al. | |
| 7,724,822 B2 | 5/2010 | Jeong et al. | |
| 7,724,823 B2 | 5/2010 | Jeong et al. | |
| 7,724,824 B2 | 5/2010 | Je-Chang et al. | |
| 7,724,828 B2 | 5/2010 | Jeong et al. | |
| 7,724,829 B2 | 5/2010 | Jeong et al. | |
| 7,742,522 B2 | 6/2010 | Jeong et al. | |
| 7,742,527 B2 | 6/2010 | Je-Chang et al. | |
| 7,764,735 B2 | 7/2010 | Jeong et al. | |
| 7,782,956 B2 | 8/2010 | Jeong et al. | |
| 7,787,538 B2 | 8/2010 | Je-Chang et al. | |
| 2008/0089421 A1 | 4/2008 | Je-Chang et al. | |
| 2010/0027620 A1 | 2/2010 | Jeong et al. | |

OTHER PUBLICATIONS

Chiu et al. "Real-Time Recursive Two-Dimensional DCT for HDTV Systems." In: IEEE [online], 1992, p. III-205 to III-208.

CCITT SGXV, Specialistes Group on Coding for Visual Telephony, NTT, KDD, NEC and Fujitsu, Proposal of Video Multiplex Coder Structure and Specification, Document #148, Nov. 1988, pp. 1-3 (incl. Annex 1 (p. 1) and 2 (pp. 1-8) to Document #148).

CCITT SGXV, Specialistes Group on Coding for Visual Telephony, Source UK, FRG, France, Italy, Netherlands, Sweden, Specification for the Flexible Prototype $2^{nd}$ Generation Videoconference Codec, Doc #82 Mar. 1986, pp. 0-6.

Motion Video Coding in CCITT SGXV—The Video Multiplex and Transmission Coding, Mike Carr et al., 1988, IEEE, pp. 1005-1010.

* cited by examiner

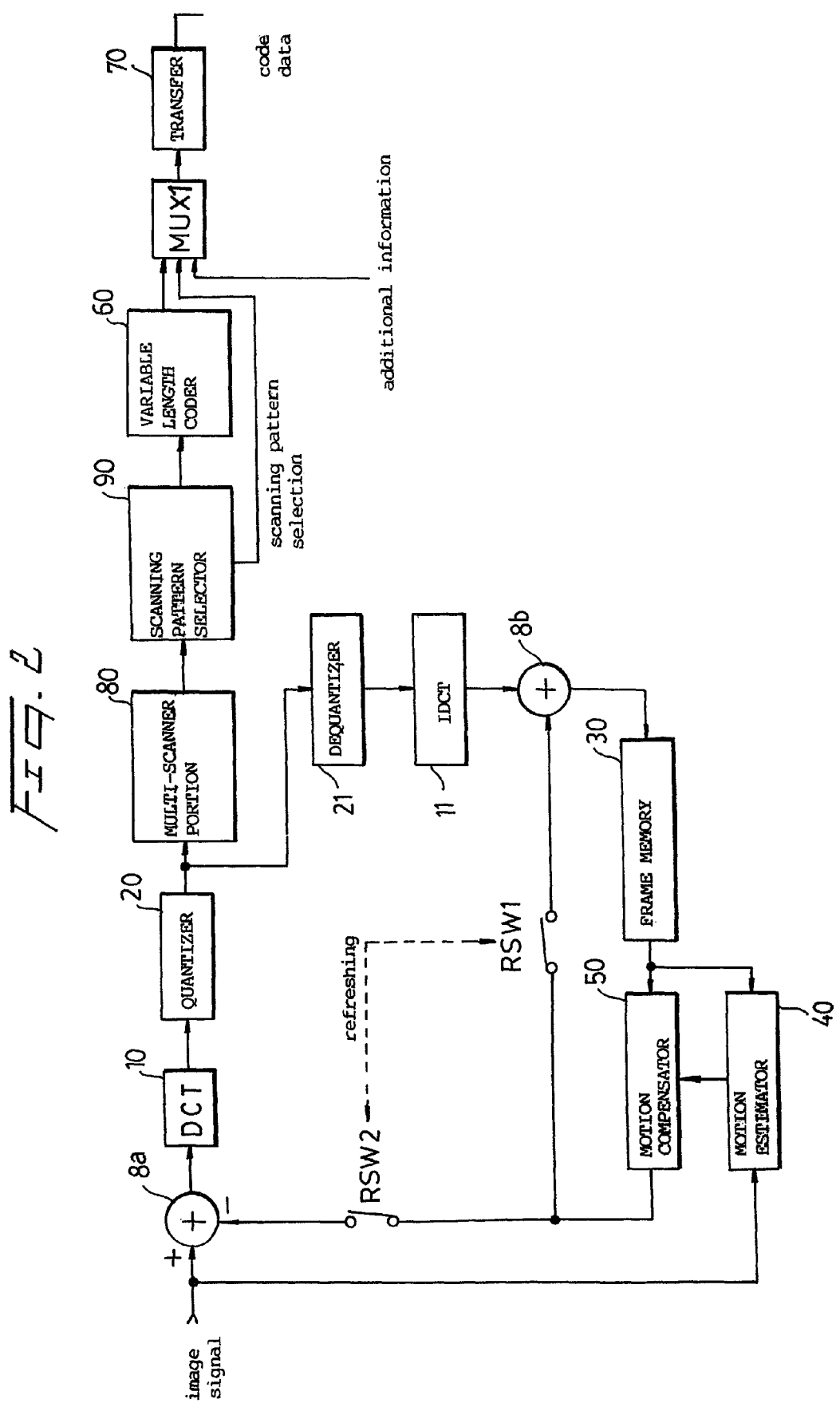

SIGNAL COMPRESSING SYSTEM

CROSS-REFERENCES TO RELATED PATENT APPLICATIONS

This is a Continuation Application of application Ser. No. 12/574,255, filed Oct. 6, 2009, which is a Continuation Application of Ser. No. 12/348,621, filed Jan. 5, 2009, issued as U.S. Pat. No. 7,616,687 on Nov. 10, 2009, which is a Continuation Application of application Ser. No. 11/873,282, filed Oct. 16, 2007; which is a Continuation Application of application Ser. No. 10/612,013, filed Jul. 3, 2003, and issued on Nov. 6, 2007, as U.S. Pat. No. 7,292,657; which is a Continuation Application of application Ser. No. 09/703,649, filed Nov. 2, 2000, and issued Jan. 20, 2004, as U.S. Pat. No. 6,680,975; which is a Continuation Application of application Ser. No. 08/024,305, filed Mar. 1, 1993, and issued on Jul. 17, 2001, as U.S. Pat. No. 6,263,026; the disclosures of which are incorporated herein by reference. One (1) Reissue application Ser. No. 10/609,438, filed on Jul. 1, 2003, of U.S. Pat. No. 6,263,026 has been abandoned. Continuation application Ser. No. 12/338,647, filed Dec. 18, 2008 and issued as U.S. Pat. No. 7,684,490 on Mar. 23, 2010, Continuation application Ser. Nos. 12/343,797, 12/343,839, and 12/343,898, all filed on Dec. 24, 2008 and issued as U.S. Pat. Nos. 7,724,821, 7,724,822, and 7,724,823, respectively, on May 25, 2010, Continuation application Ser. Nos. 12/348,510, 12/348,535, 12/348,539, 12/348,581, 12/348,590, and 12/348,621, all filed on Jan. 5, 2009 and issued as U.S. Pat. No. 7,609,760 on Oct. 27, 2009, U.S. Pat. No. 7,742,527 on Jun. 22, 2010, U.S. Pat. No. 7,724,824 on May 25, 2010, U.S. Pat. No. 7,787,538 on Aug. 31, 2010, U.S. Pat. No. 7,742,522 on Jun. 22, 2010, and U.S. Pat. No. 7,616,687 on Nov. 10, 2009, respectively, and Continuation application Ser. No. 12/497,264, filed on Jul. 2, 2009 and issued as U.S. Pat. No. 7,764,735 on Jul. 27, 2010, are Continuation Applications of Ser. No. 11/873,282.

FIELD OF THE INVENTION

The present invention relates to a signal compressing system. A system according to the present invention is particularly suited for compressing image signals. The present disclosure is based on the disclosure in Korean Patent Application No. 92-3398 filed Feb. 29, 1992, which disclosure is incorporated herein by reference.

BACKGROUND OF THE INVENTION

Image signals may be compressed by motion-compensated interframe discrete cosine transform (DCT) coding such as is defined by a MPEG (Moving Picture Expert Group) international standard. This form of signal compression has attracted much attention in the field of high definition television (HDTV).

FIG. 1 is a block diagram of such a conventional motion-compensated interframe DCT coder. In the shown coder, an image signal is divided into a plurality of sub-blocks. The sub-blocks are all of the same size, for example 8×8, 16×16, .... A motion estimator 40 produces a motion vector, defined by the difference between the current image signal and a one-frame delayed image signal, output by a frame memory 30. The motion vector is supplied to a motion compensator 50 which compensates the delayed image signal from the frame memory 30 on the basis of the motion vector. A first adder 8a serves to produce the difference between the present frame and the delayed, motion compensated frame. A discrete cosine transform portion 10 processes the difference signal, output by the first adder 8a, for a sub-block. The motion estimator 40 determines the motion vector by using a block matching algorithm.

The discrete cosine transformed signal is quantized by a quantizer 20. The image signal is scanned in a zig-zag manner to produce a runlength coded version thereof. The runlength coded signal comprises a plurality of strings which include a series of "0"s, representing the run length, and an amplitude value of any value except "0".

The runlength coded signal is dequantized by a dequantizer 21, inversely zig-zag scanned and inversely discrete cosine transformed by an inverse discrete cosine transforming portion 11. The transformed image signal is added to the motion-compensated estimate error signal by a second adder 8b. As a result the image signal is decoded into a signal corresponding to the original image signal.

Refresh switches RSW1, RSW2 are arranged between the adders 8a, 8b and the motion compensator 40 so as to provide the original image signal free from externally induced errors.

The runlength coded signal is also supplied to a variable length coder 60 which applies a variable length coding to the runlength coded image signal. The variable length coded signal is then output through a FIFO transfer buffer 70 as a coded image signal.

In motion-compensated adaptive DCT coding, the interframe signal can be easily estimated or coded by way of motion compensation, thereby obtaining a high coding efficiency, since the image signal has a relatively high correlation along the time axis. That is, according to the afore-mentioned method, the coding efficiency is high because most of the energy of a discrete cosine transformed signal is compressed at the lower end of its spectrum, resulting in long runs of "0"s in the runlength coded signal.

However, the scanning regime of the aforementioned method does not take account of differences in the spectrum of the motion-compensated interframe DCT signal with time.

A method is known wherein one of a plurality of reference modes is previously selected on the basis of the difference between the present block and that of a previous frame and the image signal is scanned by way of a scanning pattern under the selected mode and suitably quantized. With such a method, however, three modes are employed to compute the energies of the intermediate and high frequency components of the image signal in accordance with the interframe or the intraframe modes in order to determine the appropriate mode. This mode determining procedure is undesirably complicated.

SUMMARY OF THE INVENTION

According to the present invention, there is provided a signal compressing system, comprising coding means for scanning an input signal according to a plurality of different scanning patterns to provided coded versions thereof and selection means for selecting a said scanning pattern which produces efficient coding according to a predetermined criterion and outputting a scanning pattern signal identifying the selected scanning pattern.

Preferably, the input signal is an inherently two-dimensional signal, for example, an image signal.

Preferably, the coding means codes the input signal according to a runlength coding regime.

Preferably, the system includes a variable length coder to variably length code the coded signal, produced by scanning according to the selected scanning pattern.

Preferably, the system includes discrete cosine transformer means to produce said input signal. The transformer means may be a motion-compensated interframe adaptive discrete cosine transformer.

BRIEF DESCRIPTION OF THE DRAWINGS

An embodiment of the present invention will now be described, by way of example, with reference to FIGS. 2 and 3 of the accompanying drawings, in which:

FIG. 2 is a block diagram of a coding system embodying the present invention;

DETAILED DESCRIPTION OF THE PREFERRED EMBODIMENTS

Figure 1:
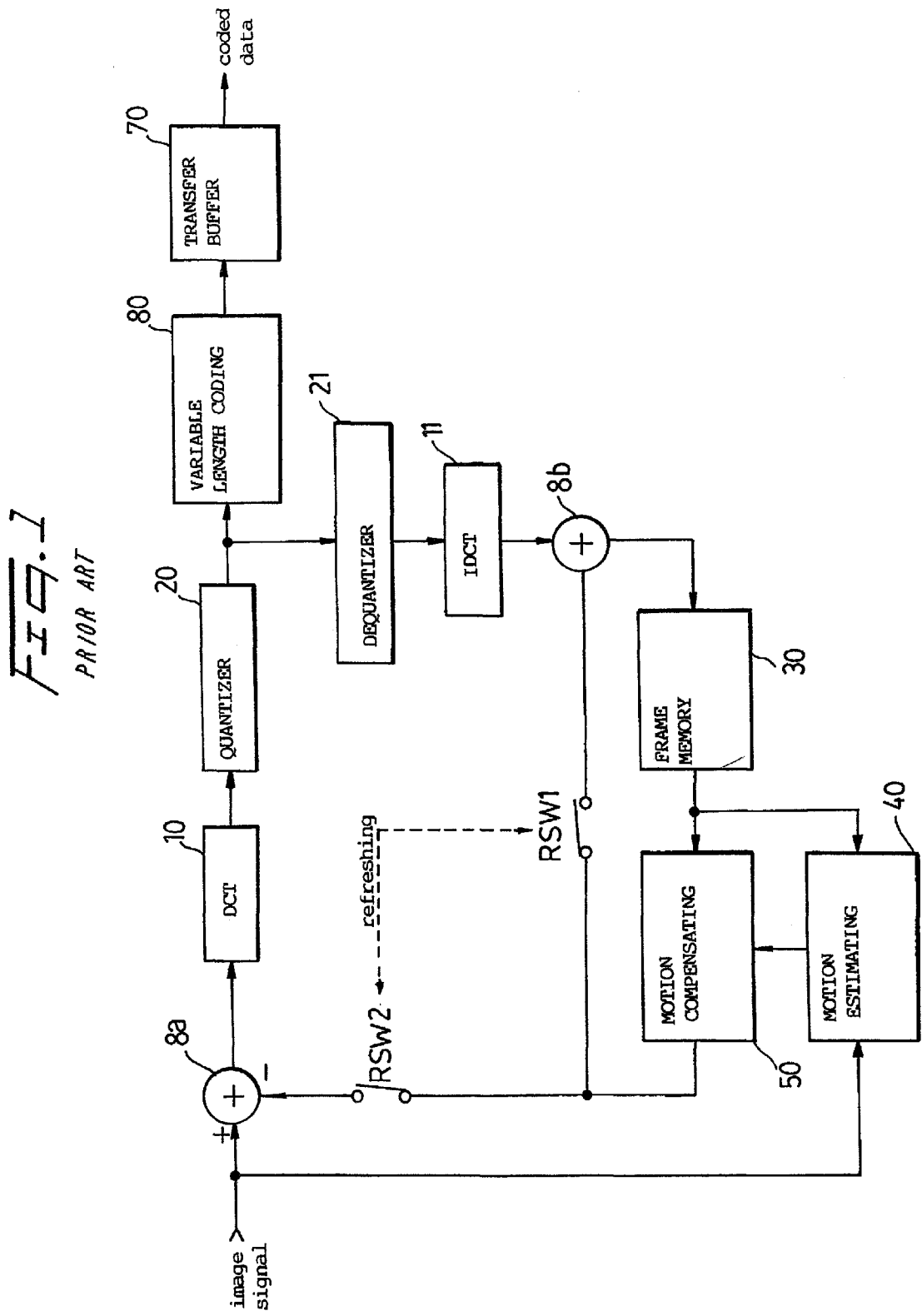
FIG. 1 is a block diagram of a conventional adaptive interframe DCT coding system employing a motion compensating technique.
Figure 3A:
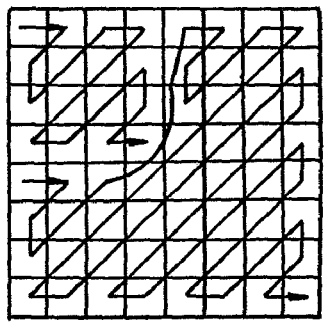
FIGS. 3A-3H show various possible scanning patterns according to the present invention.
Figure 3B:
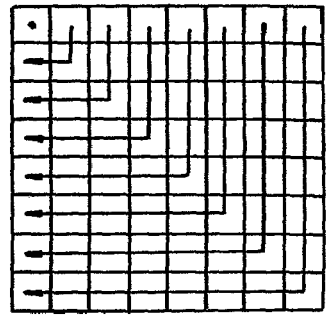
Figure 3C:
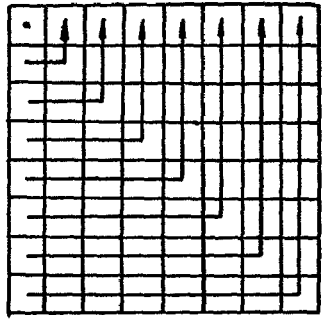
Figure 3D:
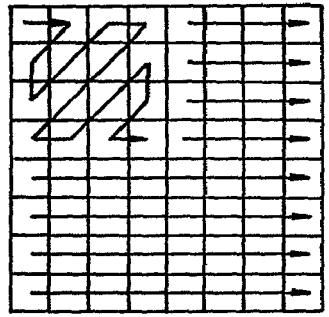
Figure 3E:
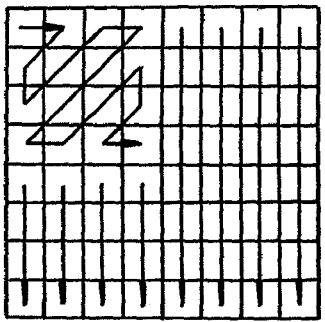
Figure 3F:
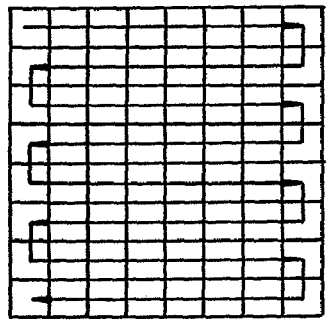
Figure 3G:
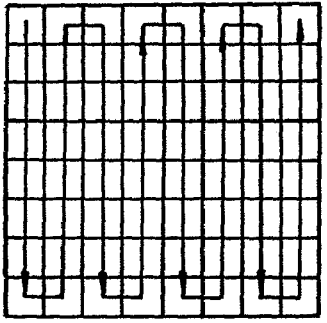
Figure 3H:
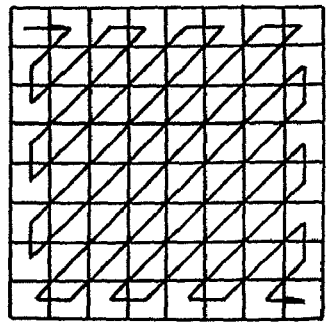

Referring to FIG. 2, an input signal is divided into equal-sized sub-blocks, for example, 8×8, 16×16, . . . . A motion estimator 40 determines a motion vector by comparing the current frame and a one frame delayed signal from a frame memory 30.

The motion vector is supplied to a motion compensator 60 which, in turn, compensates the delayed frame signal for movement. A first adder 8a produces a difference signal representing the difference between the present frame and the delayed, motion-compensated frame. A DCT coder 10 DCT-codes the difference signal. The DCT coded image signal is quantized by a quantizer 20 and then dequantized by a dequantizer 21. The dequantized signal is supplied to a second adder 8b, via IDCT 11, which adds it to the output of the motion compensator 11. This produces a signal corresponding to the original image signal.

The output of the motion compensator 50 is applied to the adders 8a, 8b by refresh switches RSW2 and RSW1, respectively.

The quantized image signal is also supplied to a multi-scanner 80 which scans it according to a plurality of predetermined patterns.

A scanner pattern selector 90 selects the scanning pattern which produces the minimum number of bits to represent the current sub-block. The scanning pattern selector also produces selection data which identifies the selected scanning pattern.

The image signal output by the scanning pattern selector 90 is variable length coded by a variable length coder 60. The variable length coder 60 compresses the image signal output by the scanning pattern selector 90. The variable length coder 60 operates such that a large proportion of the data samples are each represented by a small number of bits while a small proportion of the data samples are each represented by a large number of bits.

When a discrete cosine transformed image signal is quantized and runlength coded, the number of "0"s is increased over all, while the number of "0"s decreases as the magnitude of the signal increases. Accordingly, data compression is achieved because "0" can be represented by only a few bits and "255" can be represented by a relatively large number of bits.

Both the variable length coded signal and the selection data are supplied to a multiplexer MUX1 which multiplexes the variable length coded signal and the selection data, and optionally additional information such as teletext.

Since the variable length coded signal has data words of different lengths, a transfer buffer 70 is employed to temporarily store the multiplexed signal and output it at a constant rate.

The original image signal is reconstructed at a remote station by performing the appropriate inverse scanning of the runlength coded signal in accordance with the multiplexed scanning pattern selection data.

Figure 4:
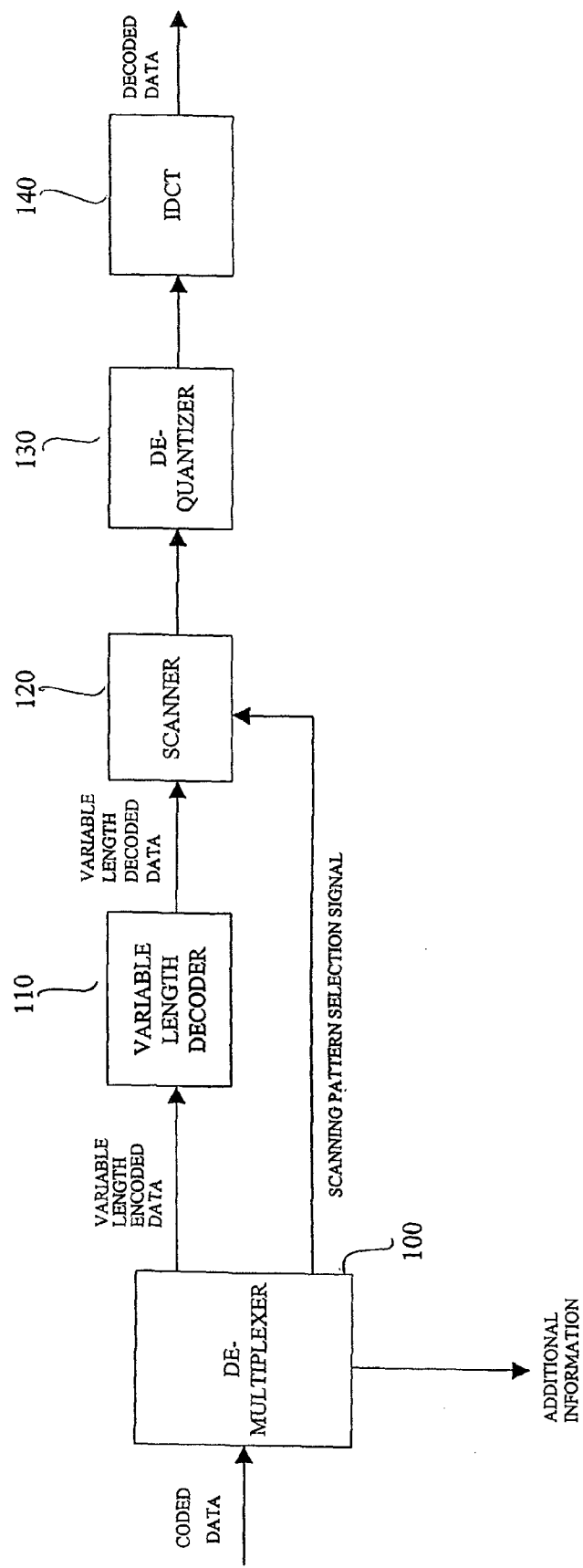
FIG. 4 is a block diagram of a decoding system according to the present invention.

FIG. 4 shows a decoding system at a remote station that receives and extracts the encoded data. In FIG. 4, demultiplexer 100 receives coded data and, in an operation inverse to that performed at the coding system, extracts the variable length encoded data, the scanning pattern information and the additional information that had been multiplexed together at the coding system. Variable length decoder 110 variable length decodes the variable length encoded data, and scanner 120 receives the variable length decoded data and reconstructs the original sub-block using a scanning pattern indicated by the extracted scanning pattern selection signal. The scanner would necessarily have to select one from a plurality pattern that was available for encoding. Using components having the same margin as dequantizers 21 and IDCT 11 in the encoder system, dequantizer 120 dequantizes the signal output from the scanner 120, and inverse discrete cosine transformer 140 performs an inverse discrete cosine transform function on the output of dequantizer 130, to output decoded data.

FIGS. 3A to 3H show possible scanning patterns employed by the multi-scanner 80. Additional scanning patterns will be apparent to those skilled in the art. However, if the number of patterns becomes too large, the coding efficiency is degraded as the selection data word becomes longer.

As described above, according to the present invention, the quantized image signal is scanned according to various scanning patterns, and then the most efficient pattern is selected.

A suitable measure of efficiency is the number of bits required to runlength code the image signal.

What is claimed is:

1. A video signal compression apparatus, comprising:
   a scanner which is operative to scan a quantized set of video frequency coefficients of an individual sub-block according to a scanning pattern which is selected from a plurality of scanning patterns to produce a set of reordered coefficients;
   an entropy coder which is operative to entropy encode the set of reordered coefficients and output an entropy encoded signal; and
   a transmitter which transmits the entropy encoded signal and a scan selection signal that is not entropy encoded, wherein the scan selection signal indicates the scanning pattern.

2. The video signal compression apparatus according to claim 1, wherein the entropy coder is a variable length coder.

3. The video signal compression apparatus according to claim 1, wherein the transmitter is a multiplexer which combines the entropy encoded signal and the scan selection signal that is not entropy encoded.

4. The video signal compression apparatus according to claim 3, wherein the scanning pattern scans each of a plurality of sub-blocks having n×n coefficients, in a following sequence: M(0,0), M(1,0), M(0,1), M(0,2), M(1,1), M(2,0), M(3,0), M(2,1), M(1,2), . . . , M(n−1,n−1), from lowest frequency to highest frequency.

* * * * *